Nov. 9, 1948.  W. LANGE  2,453,141
HOLDING FIXTURE FOR COATING OPTICAL ELEMENTS
Filed Aug. 7, 1945  2 Sheets-Sheet 2

Inventor
WERNER LANGE

By J. H. Church & H. E. Thibodeau
Attorneys

Patented Nov. 9, 1948

2,453,141

UNITED STATES PATENT OFFICE 2,453,141

HOLDING FIXTURE FOR COATING OPTICAL ELEMENTS

Werner Lange, Forest Hills, N. Y.

Application August 7, 1945, Serial No. 609,471

4 Claims. (Cl. 91—60)

(Granted under the act of March 3, 1883, as amended April 30, 1928; 370 O. G. 757)

The invention described herein may be manufactured and used by or for the Government for governmental purposes, without the payment to me of any royalty thereon.

My invention relates to devices for supporting glass or other optical elements upon whose surfaces a transparent or other coating is to be applied and it has special reference to element holding devices intended for use in the thermal evaporation method of applying such coatings.

One object of my invention is to provide a device for holding prisms and lenses in a manner which will not interfere with the area of glass to be coated.

Another object is to provide a device which is capable of simultaneously holding a quantity of prisms and lenses having various sizes and shapes in such a way that the surface of each element to be coated is equidistant from the vaporizing coating material, thereby making possible uniformly thick coats on each.

A further object is to provide such a holder which can be readily adjusted for quick, accurate and easy assemblage of differently sized and shaped prisms and lenses.

An additional object is to provide a holding fixture which can be handled easily and conveniently when carrying its full capacity of prisms, lenses or other elements assembled thereon.

In practicing my invention I attain the foregoing and other objects by providing an optical element holding fixture of unique adjustable construction and superior practical performance. One preferred form of such a fixture is shown by the accompanying drawings wherein.

*Problem which my holding fixture solves*

Figure 1:
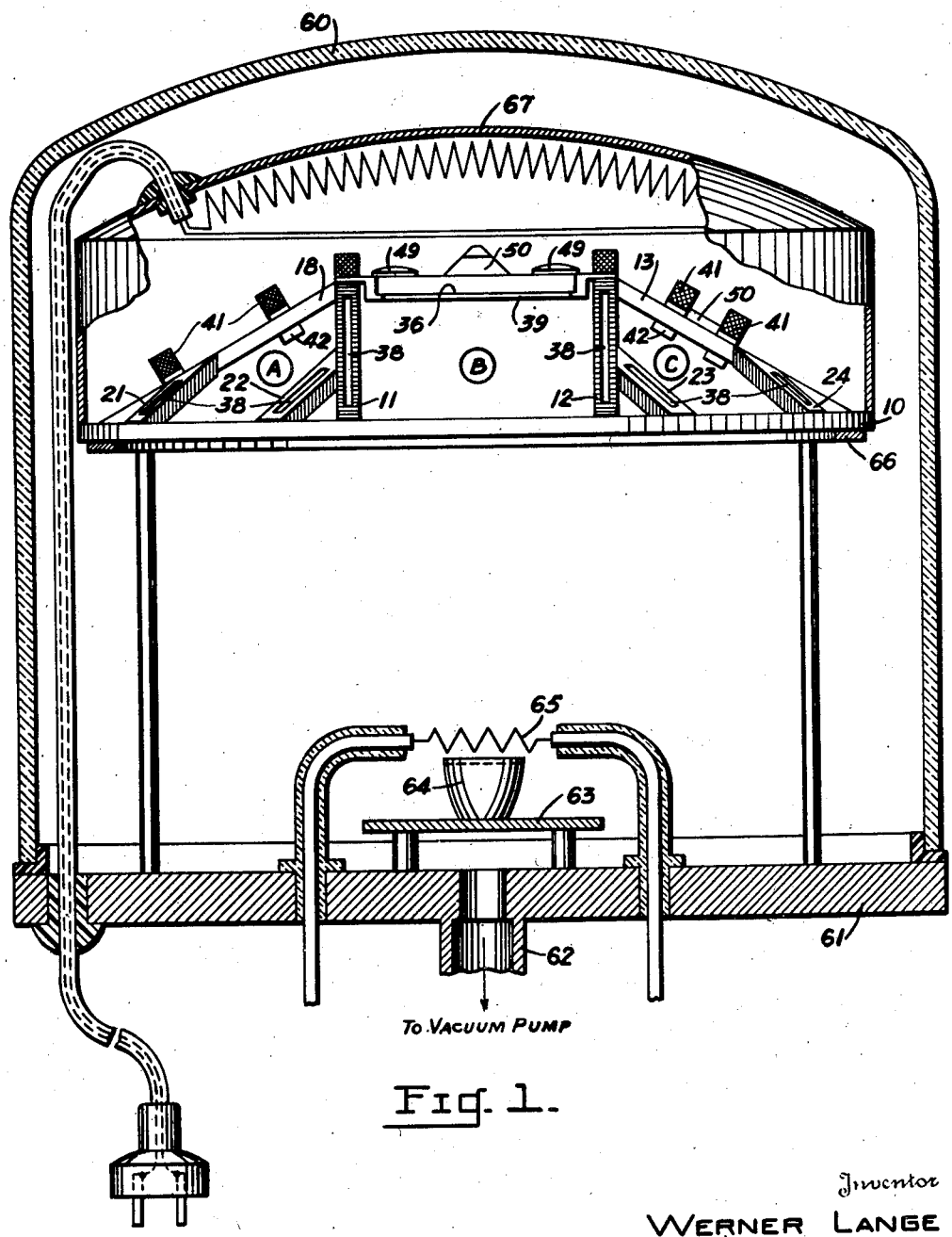
Fig. 1 illustrates my novel holder for prisms and lenses installed in a vacuum chamber equipped for thermal evaporation of metallic salts and represented in longitudinal section with part of the electric heating unit cut away.

The optical manufacturing art has in recent years experienced a considerable increase in use of coatings applied to the surface of glass with the principal object of obviating or enhancing reflection of the well-known "Fresnel" rays. One of the most satisfactory methods of applying such coatings to optical glass has been the evaporative deposition of metallic fluorides in a vacuum under high temperatures.

As the fluoride salt is vaporized in an open crucible, its vapors radiate in all directions above the surface of the container. It has long been known that the thickness of coating which built up on a glass surface by this process was largely dependent upon and inversely proportional to the distance separating the glass from the solid fluoride salt whose vapors were being disseminated.

It has become obvious, therefore, that to simultaneously and uniformly coat a number of prisms or lenses during a single evaporation of the fluoride substance, it would be desirable to position the glass blanks so that, in effect, they form a spherical arch whose center of curvature coincides with the source of fluoride vaporization.

The prior art has accordingly developed holding fixtures having such a dome shape. One such device is fitted with recesses individually designed to support a particular size and shape of prism or lens. While such a holder is serviceable, its shortcomings lie in its lack of adjustability to hold the various forms of optical glass. Thus it has been necessary to have a large number of such racks custom-built for each type or size of lens or prisms. This uneconomical practice has, in turn, impaired the efficiency of the coating process. For example, where it is desired to coat a batch of glass whose representative types include several different dimensions and designs, there is required the separate use of a fixture and a separate coating operation for each of the several variations.

A modification of this old type holding device consists of a similar dome-shaped fixture having recesses designed to support variously sized and shaped prisms and lenses. This also is not satisfactory, it being inefficient for lack of adjustability. If a batch of glass to be coated includes a surplus of one particular size and a deficiency of another, no use can be made of the glass blank retaining recesses left vacant by the latter condition. Hence, here again a separate coating operation must be performed for each variation, which procedure is wasteful of time and of the fluoride salt used.

From the foregoing, it will be apparent that a holding fixture which essentially possesses the required spherical or dome shape, and which can be readily adjusted to accommodate practically all shapes and sizes of optical glass, will fulfill a useful and practical function.

That my herein disclosed invention possesses these desirable universal features will become evident as the description hereof proceeds.

*Construction of improved adjustable holding fixture*

From the drawings it will be seen that my improved holding fixture consists of a portable truncated pyramidal framework whose frame members are so spaced that the fixture's overall contour essentially simulates a spherical segment. This framework is preferably made of a light metal (such as aluminum) which is capable of withstanding high heat. One size found to be convenient for handling is approximately 18 inches in diameter by 3½ inches high. Essentially, the fixture parts include a circular base portion 10, eight "ramps" 11 to 18 equidistantly attached to this base, and two strips 19—20 each serving to join and support a group of four of those ramps as shown. Thus constructed, the latticed fixture's subdivisions may for convenient reference be labeled lateral sections A to H and the top J (see Fig. 2).

Figure 2:
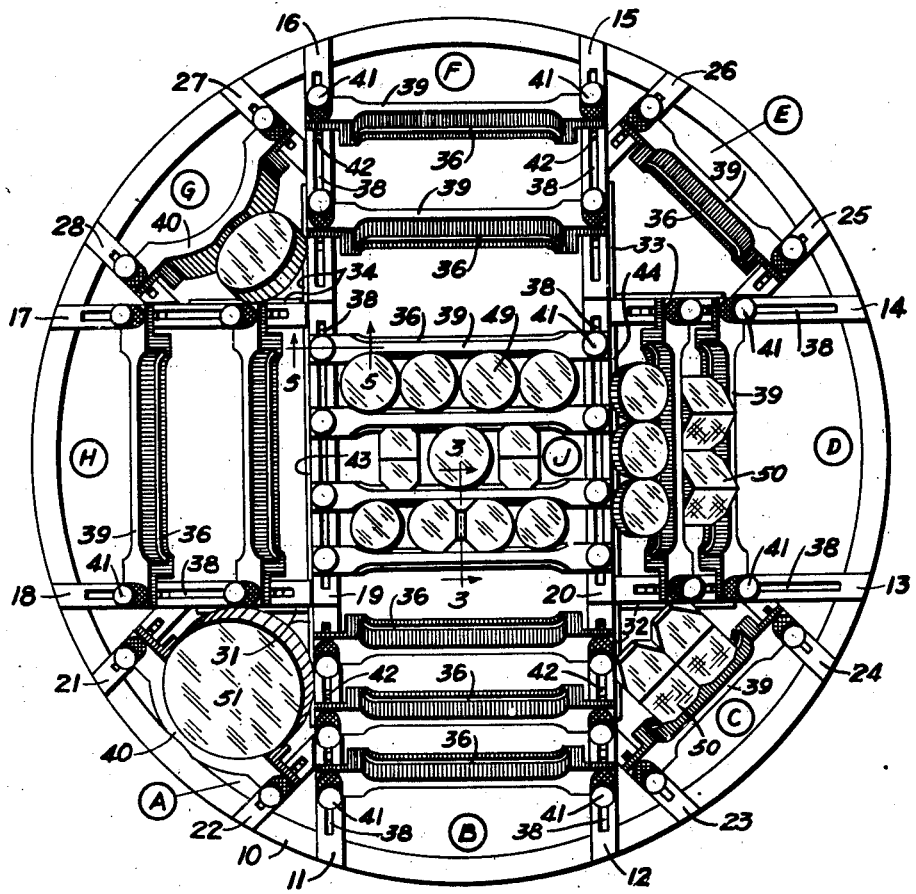
Fig. 2 is a top plan view of the uniquely adjustable optical element holding fixture of Fig. 1.

Additional serving to brace ramps 11 to 18 as well as to support an adjustable prism or lens shelf thereon are eight small ramps 21 to 28 distributed equally among each of the four lateral sections A, C, E, G. Also located in each of those sections are pairs of strips 31 to 34, attached as shown in Fig. 2, and each bearing a shelf for holding an optical glass piece. Similar shelving strips 43—44 are respectively attached to the sides of the two top members 19 and 20.

Each ramp 11 to 18 and 21 to 28, as well as the top members 19—20, have over almost their entire lengths vertical slots 38 extending therethrough. In these slots are fastened cross rails typified by the straight and curved designs shown at 39 and 40, respectively.

Figure 4:
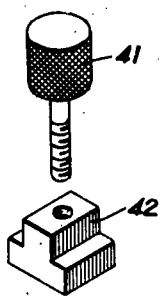
Fig. 4 is an enlarged showing of a bolt and clamp nut used to fix the holder's prism and lens supporting rails in desired position.
Figure 5:
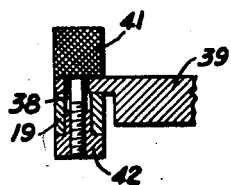
Fig. 5 is a section on line 5—5 of Fig. 2 showing the manner of clamping a rail to the fixture's latticework.

The fastening means used to position those cross rails may suitably comprise a bolt 41 and clamp nut 42 of the type shown in Figs. 4–5. The slender vertical column of nut 42 is capable of slidably fitting into the slots 38 in framework parts 11 to 28; the nut's flat base portion acting to wedge it tightly against the ramps' and other framework parts' under side of those parts. To fasten the rail at a desired point between parallel ramps or tie strips 11 to 28 in any of the fixture's sections, bolt 41 is passed through a hole in the flange at each end of rails 39—40 to thus threadably engage the clamp nut 42 in the aforementioned slots 38 therebeneath as shown in Fig. 5.

*Operation of my improved holding fixture*

Figure 3:
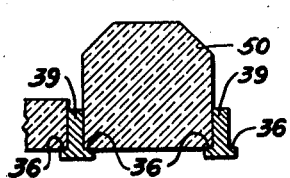
Fig. 3 is a section on line 3—3 through two of the flanged holding rails of Fig. 2 showing an optical element supported therebetween.

As will be apparent from the description and illustrations of my fixture's construction, operation of the improved holding device is exceedingly simple. For example, a pair of parallel straight rails 39 may be loosely fastened across a pair of parallel ramps 11 to 18 and 21 to 28 or top strips 19—20 in the manner previously outlined. Next, a row of lenses 49 or prisms 50, all of which are of equal width across the surfaces to be coated, is placed between the rails 39 so that these glass surfaces rest face downward upon narrow shelves 36 cut into the rails' sides. The width of these shelves 36 alters the amount of glass surface area which can be coated; by making them extremely narrow, on the order of $\frac{1}{32}$ inch wide as shown in Fig. 3, a maximum amount of glass surface is exposed to the vapors of the coating substance which deposit thereon.

The parallel rails are then brought as closely together as the intervening lenses or prisms permit, and finally the bolt 41-to-clamp nut 42 connection of Fig. 5 is made fast. By this means the rails are made to exert lateral clamping pressure on the intervening lenses or prisms, thereby serving to prevent those optical elements from being dislodged as the fixture is moved about. Additional rows can be added as needed, the supporting rails being adjusted to accommodate the varying widths of different groups of optical glass pieces.

Where necessary to mount one or more exceptionally large circular lenses 51 and when there are not enough of these pieces to warrant using the space which would be required between two parallel straight rails, a curved rail 40 may be conveniently utilized as shown in Fig. 2.

Such flexibility in mounting an assortment of sizes and shapes of glass pieces on my fixture's latticework so that they may be coated in a single operation of the coating mechanism makes possible the superior efficiency earlier described. Gone is the need to use a separate fixture for each glass form variation and likewise eliminated is the need to separately coat each group of individual optical glass types.

*Typical process utilizing improved holding fixture*

The operation and usefulness of my improved holding device will become even more apparent by illustrative reference to one process and apparatus in which it has been extensively used. This process is concerned with reducing reflections from the surface of optical glass by baking thereon, in a substantial vacuum, a quarter wave length coating of vaporized magnesium fluoride.

Used in this process is a coating apparatus which includes my unique holding fixture as shown in Fig. 1. Constituting the vacuum chamber is a bell jar 60 and a base plate 61 upon which the jar rests, forming an airtight seal. Suitable vacuum pumps (not shown) communicate with exhaust opening 62 in the base plate and are effective to evacuate the chamber to a pressure of $10^{-4}$ millimeters of mercury or better.

Supported on a tripod 63 is a crucible 64 made of ceramic or other material capable of withstanding great heat. This crucible is filled with chemically pure salts of magnesium fluoride. A 0.035 inch tungsten-chrome filament constituting part of an electrical circuit is arranged so that approximately four small turns of the wire are located over the crucible's mouth as indicated at 65.

Sections A—B—C of the Fig. 2 fixture, stripped of supporting rails and optics, can be seen in the Fig. 1 view which depicts the device supported by a large ringstand 66. A number of optical glass pieces 50 may also be seen protruding from their supports in section J of Fig. 2. Covering the fixture and these glass pieces is an electrically heated metal shield 67 which also rests on ringstand 66.

To effect a coating of the optical glass blanks 50, the chamber is first evacuated to a pressure of $10^{-4}$ millimeters. The heated shield 67 is raised to a minimum temperature of 200° F. (and preferably to 500° F. for superior performance). This heat permeates the glass blanks 50 and raises their temperature to a point where the magnesium fluoride about to be condensed thereon will be properly baked to form a durable coating.

The fluoride salt is slowly heated to permit escape of any included gases, while a shield (not shown) preferably is interposed between the salt and optical elements thereabove. The shield is then swung to one side (by magnetic means also not shown) and the fluoride salt vaporized as the filament 66 is raised to a "white heat" temperature of 1500-2000° C. This thermal evaporation causes molecular rays of the fluoride salt to be emitted in all directions, propagation thereof being further aided by the minimum atmospheric conditions afforded by the vacuous chamber.

Exposure of the under surfaces of the glass blanks 50 which face the crucible of magnesium fluoride results in the vapors condensing thereon to form the desired film. The thickness of the film varies directly with the length of exposure to the vapors and is controlled by visual examination of the coatings through an aperture (not shown) in the shield 67. The operator compares well known standards with the colors reflected from the films as they appear under white light, discontinuing the operation when the desired fluoride film thickness is achieved. After the coated glass pieces are sufficiently cooled, any fluoride condensates which may have passed through openings in the fixture and collected on the upper sides of the glass are readily removed by dissolving in ammonia water and soap solution.

*Summary*

From the foregoing description and drawings it will be evident that I have provided a uniquely constructed and otherwise improved fixture for holding optical glass and other blanks during the process of thermally evaporating optically effective coatings thereon; that this fixture offers negligible reduction (and then only at the element edges) in the area of glass to be coated; that said fixture is capable of simultaneously holding a quantity of prisms and lenses having various sizes and shapes in such a way that the surfaces of all elements to be coated are substantially equidistant from the vaporizing coating material, thereby assuring uniformly thick coats on each; that said fixture can be readily adjusted for quick, accurate and easy assemblage of differently sized and shaped prisms and lenses; and that said fixture can be handled easily and conveniently when carrying its full capacity of prisms or lenses assembled thereon.

While my improvements have been shown as embodied in a holding fixture of stated dimensions and structural material, it will be seen that the spirit of the invention can be adhered to while changing the material form of the fixture. My inventive improvements are therefore extensive in their adaption and are not to be restricted to the specific form here disclosed by way of illustration.

I claim:

1. In a fixture for holding lenses, prisms or other optical elements during surface coating thereof, the combination of a latticework structure made up of spaced substantially straight support members joined together in the form of a truncated pyramid having an equal number of sides all of similar slope and all joined at their bases by a common circular support member, removable shelving members spanning the spaces between said supports and serving clampably to hold said lenses and prisms in said latticework structure with the lower surfaces thereof substantially fully exposed from the underside of the latticework, and releasable fastening means for adjustably attaching said shelving members at desired points on said supports whereby to provide the wide variety of spacings needed to hold different sizes and shapes of prisms or lenses in the latticework.

2. Apparatus for holding lenses, prisms or other optical elements during surface coating thereof comprising a latticework structure made up of spaced substantially straight support members which are provided with slots extending lengthwise thereof and which are joined together in the form of a truncated pyramid having an equal number of sides all of similar slope and all joined at their bases by a common circular support member, removable shelving rails spanning the spaces between said slotted supports and serving clampably to hold said lenses and prisms in said latticework structure with the lower surfaces thereof substantially fully exposed from the underside of the latticework, and releasable fastening means cooperating with said support slots for adjustably attaching said rails at desired points on said slotted supports whereby to provide the wide variety of spacings needed to hold different sizes and shapes of prisms or lenses in the latticework.

3. In a fixture for holdings lenses, prisms or other optical elements during surface coating thereof, the combination of a latticework structure made up of spaced substantially straight support members joined together in the form of a truncated pyramid having an equal number of sides all of similar slope and all joined at their bases by a common circular support member, removable shelving rails spanning the spaces between said straight support members and having lengthwise recesses in the sides thereof for engaging the edges of said lenses and prisms whereby to hold same in said latticework structure with the lower surfaces thereof substantially fully exposed from the underside of the latticework, and releasable fastening means for adjustably attaching the ends of said shelving rails to desired points on said straight support members whereby to provide the wide variety of spacings needed to hold different sizes and shapes of prisms or lenses in the latticework.

4. In a fixture for holding lenses, prisms or other optical elements during surface coating thereof, the combination of a circular base, a pair of spaced and substantially parallel bridging members extending upwardly from said base to divide the total base circle into two opposing central sections between the bridging members plus two outer side arcs outside of those members, two substantially parallel side supporting members for each of said bridging members connecting spaced points on the bridging member crest with corresponding points on the adjoining base side arc whereby each of said two side arcs is divided into three sections and the total base circle is divided into eight sections that respectively are spanned by pairs of the aforesaid support members which extend from said circular base upwardly and inwardly in ramp-like fashion, removable shelving rails spanning the open spaces between parallel pairs of said supporting members and having lengthwise recesses in the sides thereof for engaging the edges of said lenses and prisms whereby to hold same in said fixture with the lower surfaces thereof substantially fully exposed from the underside of the fixture, and releasable fastening means for adjustably attaching the ends of said shelving rails to desired points on said support members whereby to provide the wide variety of spacings needed to hold different sizes and shapes of prisms or lenses in the fixture.

WERNER LANGE.

REFERENCES CITED

The following references are of record in the file of this patent:

UNITED STATES PATENTS

| Number | Name | Date |
|---|---|---|
| 168,673 | Rosenfeld | Oct. 11, 1875 |
| 741,067 | Patton | Oct. 13, 1903 |
| 2,271,239 | Vokes | Jan. 27, 1942 |
| 2,286,819 | Lee | June 16, 1942 |
| 2,337,329 | Hewlett | Dec. 21, 1943 |
| 2,341,827 | Sukumlyn | Feb. 15, 1944 |
| 2,356,136 | Wampler | Aug. 22, 1944 |
| 2,398,382 | Lyon | Apr. 16, 1946 |